(12) United States Patent
Willis et al.

(10) Patent No.: US 9,497,373 B2
(45) Date of Patent: Nov. 15, 2016

(54) REMOTE CONTROLLED STUDIO CAMERA SYSTEM

(71) Applicant: VideoLink LLC, Newton, MA (US)

(72) Inventors: Leigh Willis, Southborough, MA (US); Lawrence Honig, Newton, MA (US); (Continued)

(73) Assignee: VideoLink LLC, Newton, MA (US)

( * ) Notice: Subject to any disclaimer, the term of this patent is extended or adjusted under 35 U.S.C. 154(b) by 0 days.

(21) Appl. No.: 14/693,380

(22) Filed: Apr. 22, 2015

(65) Prior Publication Data

US 2015/0229825 A1 Aug. 13, 2015

Related U.S. Application Data (63) Continuation of application No. 13/397,619, filed on Feb. 15, 2012, now Pat. No. 9,019,372.
(Continued)

(51) Int. Cl.
*H04N 7/18* (2006.01)
*H04N 5/232* (2006.01)

(52) U.S. Cl.
CPC ...... *H04N 5/23203* (2013.01); *H04N 5/23206* (2013.01); *H04N 7/18* (2013.01)

(58) Field of Classification Search
None
See application file for complete search history.

(56) References Cited

U.S. PATENT DOCUMENTS

| 6,774,926 B1 | 8/2004 | Ellis et al. |
| 9,019,372 B2 | 4/2015 | Willis et al. |

(Continued)

FOREIGN PATENT DOCUMENTS

| EP | 1331808 A1 | 7/2003 |
| EP | 2059045 A2 | 5/2009 |

(Continued)

OTHER PUBLICATIONS

International Search Report and Written Opinion mailed Sep. 25, 2012 in corresponding PCT application No. PCT/US2012/025426.
(Continued)

*Primary Examiner* — Eileen Adams
(74) *Attorney, Agent, or Firm* — Nields, Lemack & Frame, LLC (57) ABSTRACT

A system for remotely controlling a camera is disclosed. The system includes five major subsystems; a first subsystem collocated with the camera; a second subsystem which serves as a gateway between the camera and the third subsystem; a third subsystem to remotely monitor the studio and control the camera; a fourth subsystem located at the destination of the video stream; and a fifth subsystem to receive and re-transmit a video control stream. This system allows the camera to be monitored and controlled by one location, while the primary video stream is transmitted to a different location. In some embodiments, the control video stream is a lower bandwidth signal than the primary video stream. Furthermore, the fifth subsystem is capable of receiving and re-transmitting control video streams from a plurality of cameras simultaneously. The second subsystem allows remote access to the first subsystem, such as via the third subsystem, based on approved credentials.

15 Claims, 9 Drawing Sheets

(72) Inventors: Charles Mark Honig, Newton, MA (US)

Related U.S. Application Data (60) Provisional application No. 61/444,194, filed on Feb. 18, 2011.

(56) References Cited

U.S. PATENT DOCUMENTS

| | | |
|---|---|---|
| 2002/0023165 A1 | 2/2002 | Lahr |
| 2002/0097322 A1 | 7/2002 | Monroe et al. |
| 2004/0003051 A1 | 1/2004 | Krzyzanowski et al. |
| 2004/0078825 A1* | 4/2004 | Murphy ............... H04N 7/147 725/109 |
| 2006/0242677 A1 | 10/2006 | Kostadinovich |
| 2009/0040288 A1* | 2/2009 | Larson ............... H04N 7/142 348/14.09 |
| 2010/0013918 A1* | 1/2010 | Ta ' Eed ............ H04N 1/00106 348/143 |
| 2010/0165830 A1 | 7/2010 | Amir et al. |
| 2011/0109808 A1* | 5/2011 | Li .......................... H04N 5/45 348/725 |
| 2012/0212609 A1 | 8/2012 | Willis et al. |
| 2012/0331109 A1* | 12/2012 | Baum ............... G06F 17/30017 709/219 |
| 2015/0358668 A1 | 12/2015 | Akimchuk et al. |

FOREIGN PATENT DOCUMENTS

| | | |
|---|---|---|
| JP | 2004-080256 A | 3/2004 |
| JP | 2005-005958 A | 1/2005 |
| JP | 2008-118271 A | 5/2008 |
| WO | 2006/073008 A1 | 7/2006 |

OTHER PUBLICATIONS

Japanese communication, with English translation, dated Dec. 22, 2015 in corresponding Japanese patent application No. 2013-554600.

European communication dated Jan. 26, 2016 in corresponding European patent application No. 12746651.4.

European communication dated May 23, 2016 in corresponding European patent application No. 12746651.4.

* cited by examiner

REMOTE CONTROLLED STUDIO CAMERA SYSTEM

This application is a continuation of U.S. patent application Ser. No. 13/397,619 filed Feb. 15, 2012, which claims priority of U.S. Provisional Patent Application Ser. No. 61/444,194, filed Feb. 18, 2011, the disclosures of which are incorporated herein by reference in its entirety.

BACKGROUND OF THE INVENTION

The flood of news, financial, political and other informational television programs has generated an ever increasing demand to utilize on-air experts, such as investment bankers, lawyers, and politicians. The presence of these experts adds credibility and an in-depth analysis of a given topic that is not otherwise possible.

Traditionally, for this interview to occur, the expert is forced to travel to the television studio of the television show that is interested in interviewing this expert. This involves costs for the television program, and an inconvenience for the expert. For example, the expert would have to travel to the studio, where they are prepared for the interview through hair and makeup, and appear on camera. They then travel back to their office. Often, experts appear without monetary compensation, as the publicity associated with being on-air is considered compensation. For many corporations, the publicity is not worth the lost time and expense associated with visiting a studio. In addition, such an arrangement does not allow for real-time analysis of time-sensitive events, such as breaking news, corporate mergers, or political reaction, as the experts need time and sufficient notice to travel to the studio.

To solve this problem, remote control studios have been created. In such a studio, there may be a camera, a zoom lens system, pan/tilt capability, an audio package, studio lighting package and, in some cases, an interruptible fold back system to allow the experts to hear questions from an interviewer. In some cases, a TV monitor, a VCR or DVD player may also be present. As a further enhancement, a backdrop system can be added using a large television or video monitor. Different images may be displayed on the screen to provide different backdrops, including daytime and nighttime city skylines and company logos. These backdrops help give the remote studio a more professional look on air and are an advancement over the more conventional backgrounds previously used.

In the case of a remote control studio, the video feed travels through a TV1, 270 Mb or 1.5 Gb fiber optic circuit to the long distance video carrier POP. Typically, the signal travels via fiber optic cable to the technical operations center, although satellite transmission is also possible. The communication infrastructure required to transmit the video feed from the remote studio to the control location may be expensive. The fiber-based long distance transmission model involves a high installation cost, high monthly recurring cost and modest per-usage cost.

In addition, the control of the camera and studio is typically at a location different from that receiving the live video feed. This control location may have dedicated equipment in order to control the camera, which may be very specialized. In addition, such equipment may only be able to control one camera at a time. Therefore, to control two cameras simultaneously, it may be necessary to have two complete sets of control equipment.

It would be beneficial if the current one-to-one control of the remote camera could be eliminated. In addition, it would be advantageous if less expensive means were available to deliver the video stream from the remote studio to the distribution site.

SUMMARY OF THE INVENTION

The problems of the prior art are addressed by the present system and method for remotely controlling a camera. The system includes five major subsystems; a first subsystem (or video source) collocated with the camera; a second subsystem (or relay server) which serves as a gateway between the camera and the third subsystem; a third subsystem (or control computer) to remotely monitor the studio and control the camera; a fourth subsystem (or video target) located at the destination of the video stream; and a fifth subsystem to receive and re-transmit a video control stream. This system allows the camera to be monitored and controlled by one location, while the primary video stream is transmitted to a different location. In some embodiments, the control video stream sent to the fifth subsystem is a lower bandwidth signal than the primary video stream. In some embodiments, one or both video streams are transmitted over existing internet connections. Furthermore, the fifth subsystem is capable of receiving and re-transmitting control video streams from a plurality of cameras simultaneously. The second subsystem also allows remote access to the first subsystem, such via the third subsystem, based on approved credentials.

DETAILED DESCRIPTION OF THE INVENTION

Figure 1:
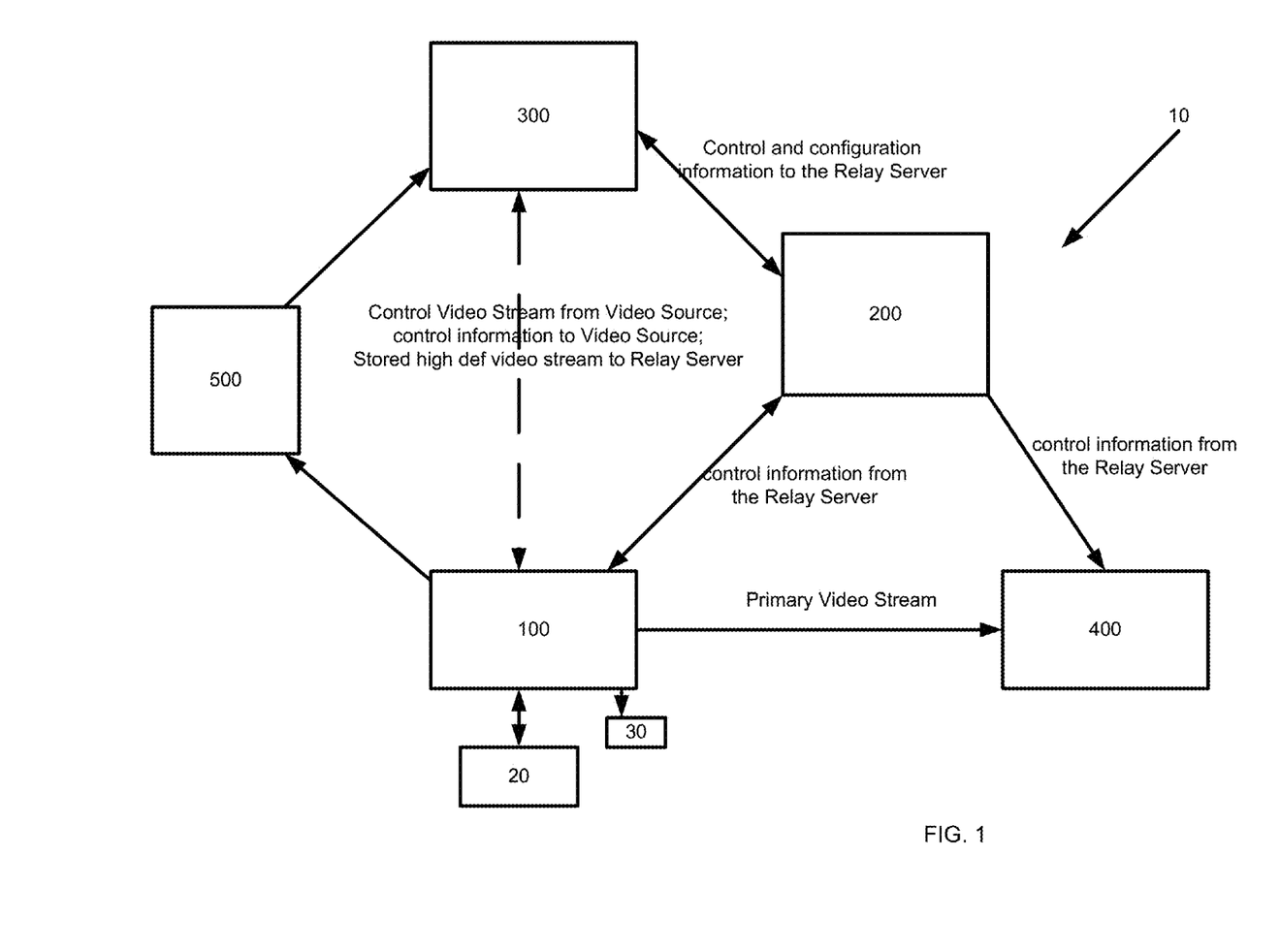
FIG. 1 represents a block diagram of the video system according to one embodiment.

FIG. 1 shows a block diagram of the present invention. The system 10 contains five major subsystems. The first subsystem 100, or video source, is collocated with the camera 20 in a studio. The second subsystem 200, or relay server, may be located remotely from the first subsystem 100 and operates as a central connection through which the configuration and control of the camera 20 and equipment within the studio is routed. The third system 300, or control computer, is also remote and allows the user to remotely control and monitor the camera 20 and the equipment such as via a webpage served by the second subsystem 200. The fourth subsystem 400, or video target, receives the primary video stream from the first subsystem 100. The fifth subsystem 500, or control stream server, receives a lower bandwidth video stream from the first subsystem 100 and delivers it to the control computer 300. It should be noted that FIG. 1 shows one of each type of subsystem. However, in practice it is likely that there will be multiple instances of the first subsystem 100, the fourth subsystem 400, and the third subsystem 300. Thus, the invention is not limited to a single instance of each subsystem. Furthermore, in some embodiments, one or more of these subsystems may be integrated into a single physical computing device. For example, the control computer 300 may be integrated with the control stream server 500, or with the relay server 200. In other embodiments, the relay server 200 and the control stream server 500 may be integrated.

The first subsystem 100, or video source, includes an input to receive the output from camera 20. The subsystem 100 also includes multiple outputs to control the various components within the studio. The camera may also include a zoom lens system and pan/tilt controller. In addition to camera 20, the studio may also include lighting equipment 30, and other equipment. The subsystem 100 also has a variety of outputs that are used to actuate the camera 20, the lighting equipment and the other equipment. These outputs may be of various formats, such as USB, FireWire, RS232, or any other protocol. The invention is not limited by the format used to communicate between the subsystem 100 and studio components. Throughout this disclosure, the terms "first subsystem", "RC2-X", and "video source" are used interchangeably to denote this first subsystem 100.

In addition to the interfaces between the subsystem 100 and the studio components, there are interfaces between the first subsystem 100 and the second, fourth and fifth subsystems 200, 400, 500. In some embodiments, the communication between the various subsystems is conducted over the internet. In some embodiments, there are one or more network interface cards (NICs) which are used to connect each subsystem to the internet. In some embodiments, the NIC utilizes Ethernet to connect to the internet. In one embodiment, a NIC is used to transfer the primary video stream to the fourth subsystem 400, and is also used to transfer the control video stream to the fifth subsystem 500. In other embodiments, separate NICs may be used to transmit the respective video streams.

Figure 2:
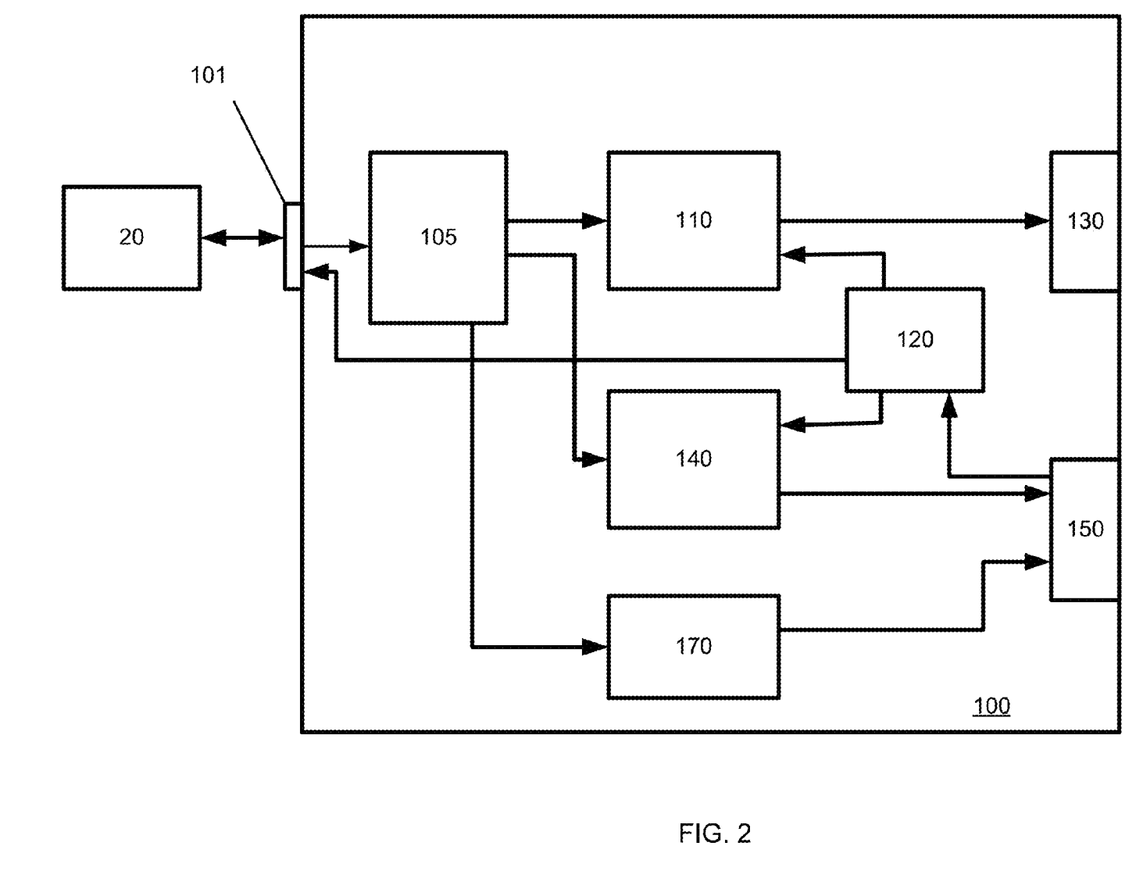
FIG. 2 represents a block diagram of the first subsystem, or video source, according to one embodiment.

FIG. 2 shows a block diagram of the first subsystem 100. Beginning first with the data path, the video from the camera 20 is received by the subsystem 100, via connector 101. This connector 101 may be any suitable interface, such as a BNC connector carrying an SDI signal. In some embodiments, connector 101 may be more than one connector that carries control information from SS100 to SS20. These can be, for example, serial signals or Ethernet signals. This video input is captured, by a video capture component 105, then passed to a first compression module 110 which encodes and compresses the video stream to reduce the bandwidth required to transmit it further. The compression module 110 may be implemented in software, such as by utilizing software compression algorithms executing on a processing unit 120. The processing unit 120 may be a dedicated processor, or may be an industry standard processor, such as an Intel CPU. The software used for the compression may be customized for this application, or may be a commercially available module, such as Open Source code. In other embodiments, a dedicated hardware module, designed to encode and compress the video stream, may be used. In the preferred embodiment, the compression algorithm and resulting bandwidth and format used (i.e. NTSC, PAL, etc) may be programmable. In one embodiment, the video stream may be NTSC standard definition, having standard definition and 525 lines at roughly 30 frames per second. The video stream may also be a high definition (HD) format, such as 720p, 1080i and 1080p. The resulting encoded, compressed video stream is then encapsulated in a network packet format, such as Ethernet, ATM or any other suitable protocol. In some embodiments, an IP (Internet Protocol) packet is preferred. These packets are then transmitted via NIC 130.

As stated above, the packets are preferably transmitted over Ethernet to the internet, utilizing commercially available internet connectivity. For example, dedicated trunk lines, cable lines (such as Comcast Internet), fiberoptic lines (such as Verizon FIOS) or other means may be used to carry the packets to the internet. The bandwidth required for a high definition video stream over IP is about 6 Mbps, so the preferred transport mechanism is capable of at least this upload bandwidth. In contrast, the control video stream may be compressed such that it requires only about 800 kbps.

In some embodiments, subsystem 100, using first compression module 110, second compression module 140 or processing unit 120 may also provide compression of previously recorded files for easier transmission.

In some embodiments, the video stream output from the video capture component 105 may be stored on a high capacity storage device 170 located within the first subsystem 100. This storage device, which may be a magnetic disk drive, is used to store a high definition video stream, which can be transmitted at a later date. The capacity of this storage device 170 is not limited by the present invention and may be any suitable capacity, based on cost and required functionality. In some embodiments, the resolution and definition of the video stream stored in the storage device 170 is greater than the primary video stream transmitted by NIC 130. This is because there are no time or bandwidth constraints on the delivery of this video stream. In some embodiments, post processing is performed by the second subsystem 200 on this high definition video stream. In some embodiments, the high definition stream from the storage device 170 is transmitted by a second NIC 150. In other embodiments, the high definition stream is transmitted by the first NIC 130. While this recorded high definition video stream may be transmitted to any destination, in some embodiments, it is routed to the control computer 300, an FTP server or to the relay server 200.

A second compression module 140 may also be included in subsystem 100. This compression module 140 may be implemented in the same manner as first compression module 110. In other embodiments, it may be implemented differently. In the preferred embodiment, the output of the second compression module 140 is transmitted to the fifth subsystem 500. As such, there is no need for a high definition stream. In fact, the resolution is less important for this control video stream, although it is important that the stream be delivered in real time. In some embodiments, a QCIF 320×240, 15 frames per second video stream is produced, although other formats are within the scope of the invention. As with the first compression module 110, the output from the second compression module 140 is encapsulated using a network packet format, such as Ethernet. In some embodiments, a second NIC 150 may be utilized to transmit the lower bandwidth control video stream. As described above, any suitable transport mechanism may be used to transmit the control video stream to the internet. In other embodiments, it is envisioned that NIC 130 is used to transmit both streams. Audio is typically transmitted in the control video stream as well.

In addition to a data path, the first subsystem 100 also includes a control path, where control information, used to control the equipment in the studio, is transmitted. In one embodiment, the control and configuration information, which can originate at the second subsystem 200 or third subsystem 300, enters the first subsystem 100 via NIC 150. The control information is preferably encapsulated in a network protocol, such as IP. The control information is un-encapsulated and interpreted by the processing unit 120. A format is defined between the second subsystem 200 and the first subsystem 100, such that the contents of the control packets can be decoded by the processing unit 120.

In one embodiment, an application programming interface (API) is defined between the subsystems such that the second subsystem 200 transmits control information in the form of "zoom in 1 unit", or "move the camera left 2 units". The processing unit 120 interprets these commands and converts them to device specific commands for the particular piece of equipment being controlled. An advantage of this approach is that new equipment can be incorporated in the first subsystem 100 without any modification to the code or protocols used by the other subsystems.

Once the processing unit 120 has decoded the control information, it can actuate the various components in the studio, by sending signals via the interface 101. In some embodiments, zoom is part of the integrated camera/lens/pan and tilt system. In other embodiments, zoom is controlled by an external lens controller. Lighting is controlled via a remotely actuated relay or variable dimming system. In some embodiments, the "DMX" lighting control protocol may be used. The actual protocols used to control these devices are an implementation decision and all such protocols are within the scope of the invention.

Each of the subsystems 100, 200, 300, 400, 500 may include a processing unit to perform the functions needed by that particular subsystem. In some embodiments, the processing unit may include an Intel based processor, having one or more processor cores. In communication with the processor is a memory element, adapted to store the instructions and data needed by the processor. In some embodiments, the processor may execute an operating system, such as a version of Linux, or another suitable operating system, which may be commercially available or written specifically for this application. In addition, other software code and applications are also provided that enable the functionality described throughout this disclosure. In some cases, the software components are unique and original. In other embodiments, some of the software components may be Open Source. The invention is not limited by the method used to implement the recited functionality. Other resources, such as input/output components, and high capacity storage devices may also be part of the processing unit.

Referring to FIG. 1, the second subsystem 200 is responsible for remotely controlling access to the subsystem 100, which includes camera 20, lighting equipment 30 and studio equipment. The second subsystem 200 also relays control information, such as zoom, tilt and pan controls from the third subsystem 300 to the first subsystem 100. The second subsystem 200 communicates with each of the other subsystems and contains much of the software that is required to operate the overall system, as will be described in more detail below. It should be noted that second subsystem 200 may also contain the system database, such as a SQL server, to provide functions such as transaction logging, authentication management and configuration management. The second subsystem 200 is also referred to as the relay server in this disclosure.

The third subsystem 300 communicates with the second subsystem 200. As such, the third subsystem includes a processing unit and a NIC. The third subsystem accesses the second subsystem 200, and once authenticated, is able to control one or more subsystems 100 and their associated equipment. The third subsystem 300 is also referred to as the control computer in this disclosure.

Figure 3:
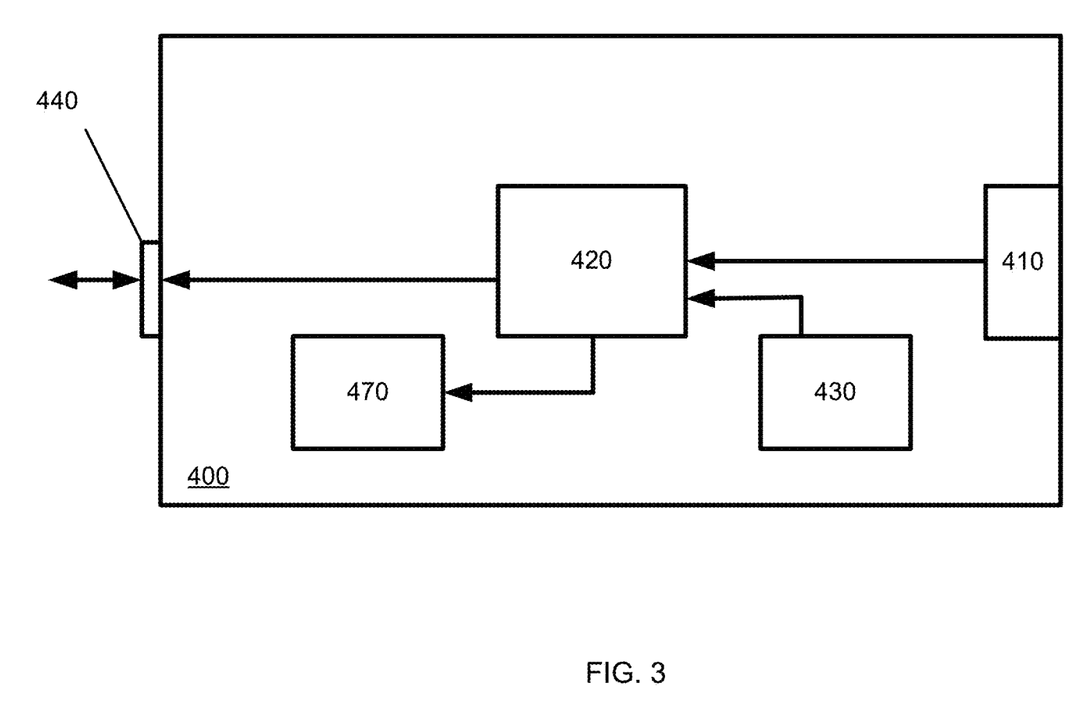
FIG. 3 represents a block diagram of the fourth subsystem, or video target, according to one embodiment.

The fourth subsystem 400 is the destination of the primary video stream, delivered by the first subsystem 100. FIG. 3 shows a block diagram of the components of the fourth subsystem 400. A NIC 410 is provided to receive the encapsulated packets that were transmitted over the internet by the first subsystem 100. These packets are received and enter a decompression module 420, which restores the original video stream, as it was captured by camera 20. This decompression module 420 may include a general purpose processing unit 430, such as an Intel processor, executing instructions adapted to decompress the received video stream. In other embodiments, the module 420 may be a dedicated hardware module. In some embodiments, the video stream output from the module 420 may be stored on a high capacity storage device 470 located within the fourth subsystem 400. In other embodiments, the video stream may be recorded prior to decompression. This storage device, which may be a magnetic disk drive, is used to store a high definition video stream which can be transmitted at a later date. The capacity of this storage device 470 is not limited by the present invention and may be any suitable capacity, based on cost and required functionality. The output of the module 420 then exits the subsystem 400 via connector 440, and is then handed off to other video equipment, such as a video router or television production switcher. This may be a BNC connector carrying an SDI signal. In this disclosure, the terms "fourth subsystem", "RC2-Z", and "video target" are all used to represent the further subsystem 400.

In some embodiments, the components in the first subsystem 100 and the fourth subsystem 400 may be identical, with different software executing on each. In other embodiments subsystem 400 could be a dedicated commercially available video decoder.

Referring to FIG. 1, the fifth subsystem 500 is responsible for receiving control video streams from the first subsystem 100. This subsystem 500 contains a processing unit, and one or more NICs, which are adapted to receive control video streams from one or more first subsystems 100. The fifth subsystem 500 then transmits a selected video control stream to control computer 300 using a NIC.

Having described the major components of the subsystems, the operation of the software in the system will now be described. As stated above, the first subsystem 100 interfaces to the camera 20 and produces several video streams as outputs. One of those video streams, typically the lower bandwidth stream is routed over the internet to the subsystem 500, also known as the control stream server. The control stream server 500 receives control video streams from a plurality of first subsystems 100. The video control streams are made available to the third subsystem 300. The second subsystem 200 can grant access to one or more of these first subsystems 100 to one or more third subsystems 300.

Figure 4:
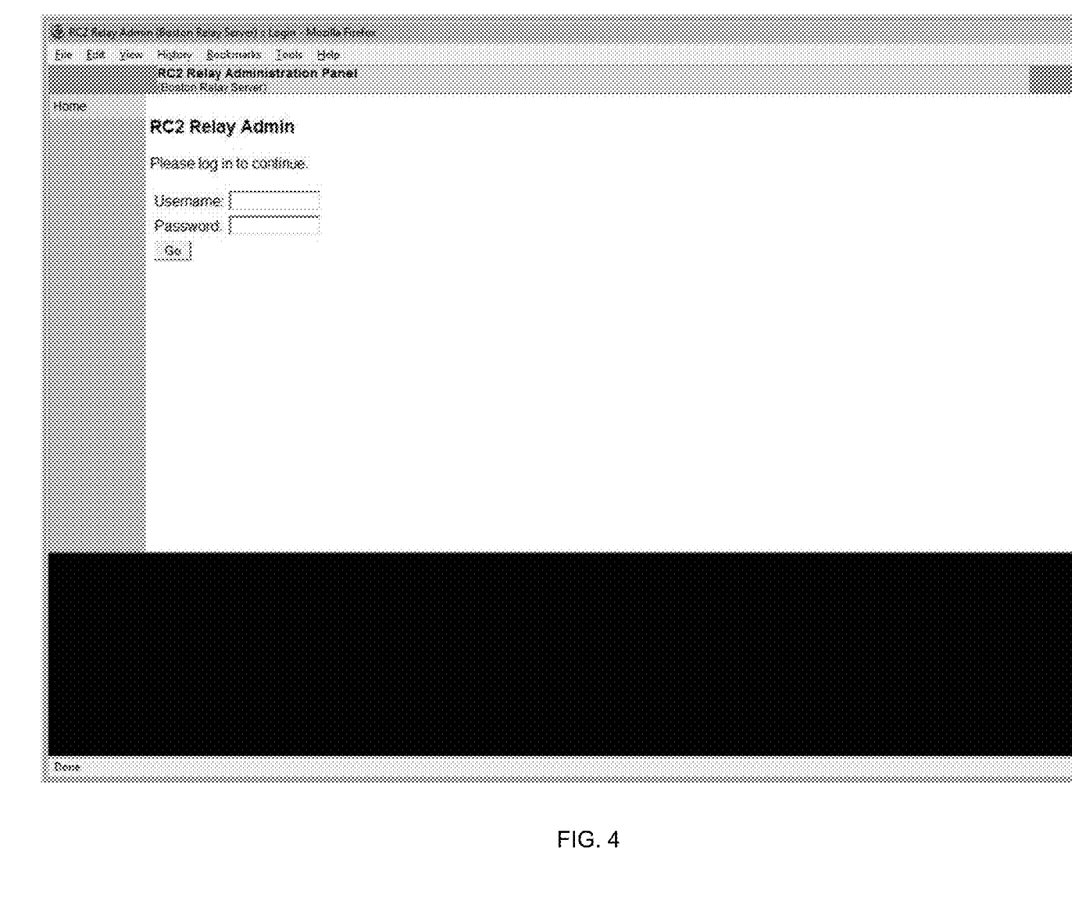
FIG. 4 shows one embodiment of an authentication web page served by the relay server.

Referring to FIG. 1, the process of initiating and controlling a studio will be described. First, a third subsystem 300, also known as a control computer, accesses the relay server 200. The relay server serves a web page to the third subsystem 300. One such web page is shown in FIG. 4. In one embodiment, the relay server 200 requests a username and password from the operator at the third subsystem 300. In other embodiments, other methods of authentication are used. In response to this, the user at the control computer 300 enters the requested credentials. Based on this, the relay server 200 may allow access to the system 10. In some embodiments, different users may be given different levels of access. For example, one user may only be allowed access to only one specific first subsystem 100. Other users may have access to a plurality of first subsystems 100. The system administrator may have access to all of the first subsystems 100. Similarly, users may only have access to a subset of the video targets 400.

Figure 5:
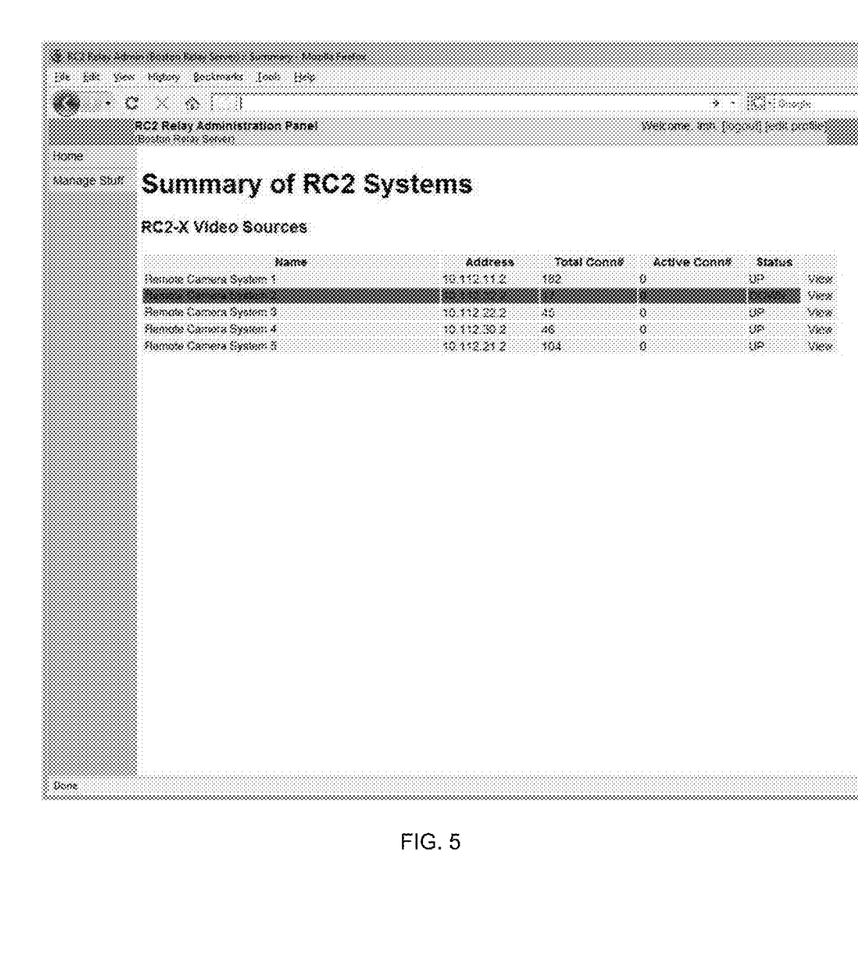
FIG. 5 shows an embodiment of a webpage served by the relay server to the control computer.

FIG. 5 shows a representative screen shot that may be used after the user is authenticated. In this figure, the user has been given access to a plurality of first subsystems 100 (referred to as RC2-X video sources). Although not shown in FIG. 5, the user may also have access to a plurality of fourth subsystems 400 (referred to as RC2-Z video targets). Each video source 100 has a name and an address. The addresses may be an IP address, or may be a domain name. In some embodiments, the addresses are hidden from the user and only a description name is supplied. It is important to note that, for a different user, the number of accessible video sources and video targets may be different. In addition, the identity of the video sources and video targets made available to a different user may vary from that shown in FIG. 5. It should be noted that the available video sources and video targets may be presented to the user in a different format. In the present embodiment, the user would select a particular video source, by clicking on the word "View", next to the desired video source.

In this example, it is assumed that the user has clicked "view" on the first video source. In response to this, the relay server 200 serves a new webpage, which shows the current status of this video source. In this embodiment, the webpage allows the user to select the RC2-Z system (i.e. which fourth subsystem 400 will receive the primary video stream from the selected first subsystem 100). On FIG. 6, it is shown that the user has selected one of the video targets listed in FIG. 5. In addition to selecting the target of the video stream, the user also selects the bit rate used for the transmission. In other words, the user may select different levels of compression based on the available bandwidth. For example, video sources and video targets which utilize high speed fiberoptic connections may be able to support higher datarates than those using lower speed internet connections. In some cases, the users may pay different rates depending on the bandwidth consumed, and this may affect their decision. The first subsystem 100 also has the ability to output different format control video streams. In the default configuration, the system may use a Flash video format to stream to (and through) the fifth subsystem 500. The "Media Server" field may have a default setting, such that the video is transmitted to a main datacenter subsystem 500 (such as based on URL). In other embodiments, the first subsystem 100 can be configured to use a different specific subsystem 500 based on this field. The "Feed Name" is a unique randomly created string (per session) that is used by the first subsystem 100 to name the control video stream. The control video stream is then referenced by this name by the subsystems 200, 300 and 500.

Figure 6:
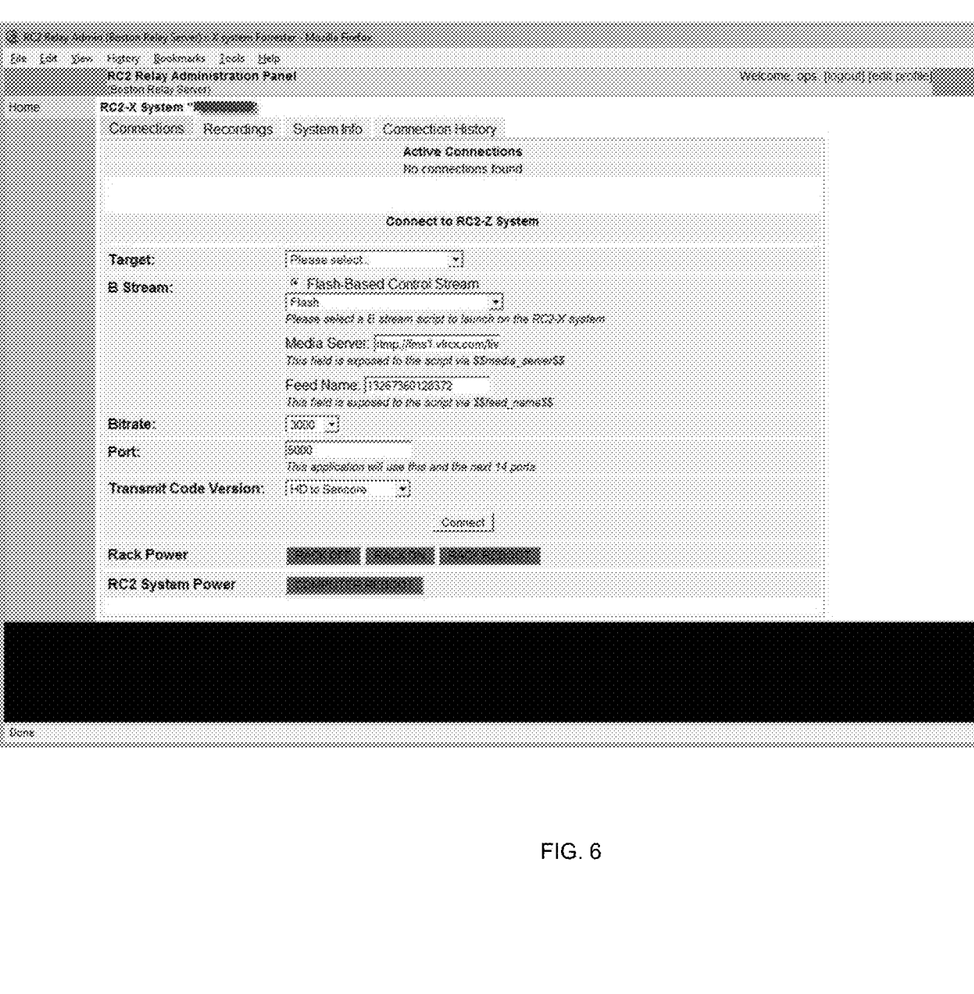
FIG. 6 shows one embodiment of a subsequent webpage served by the relay server to the control computer.

Once the user has selected the video source (i.e. the desired first subsystem 100) and the video target (i.e. the desired fourth subsystem 400), the user clicks "Connect". This action causes the relay server 200 to implement the steps needed to associate these subsystems which each other. In some embodiments, the relay server 200 will prepare a configuration script, which is sent to the selected first subsystem 100. This configuration script includes control information, such as compression method and resolution, and the desired video target. This desired video target may be expressed as an IP address, or as a domain name. The relay server 200 may also communicate with the desired video target (or fourth subsystem 400), and communicates the identity of the selected video source 100, and, optionally, the format in which the video stream will be delivered.

Figure 7:
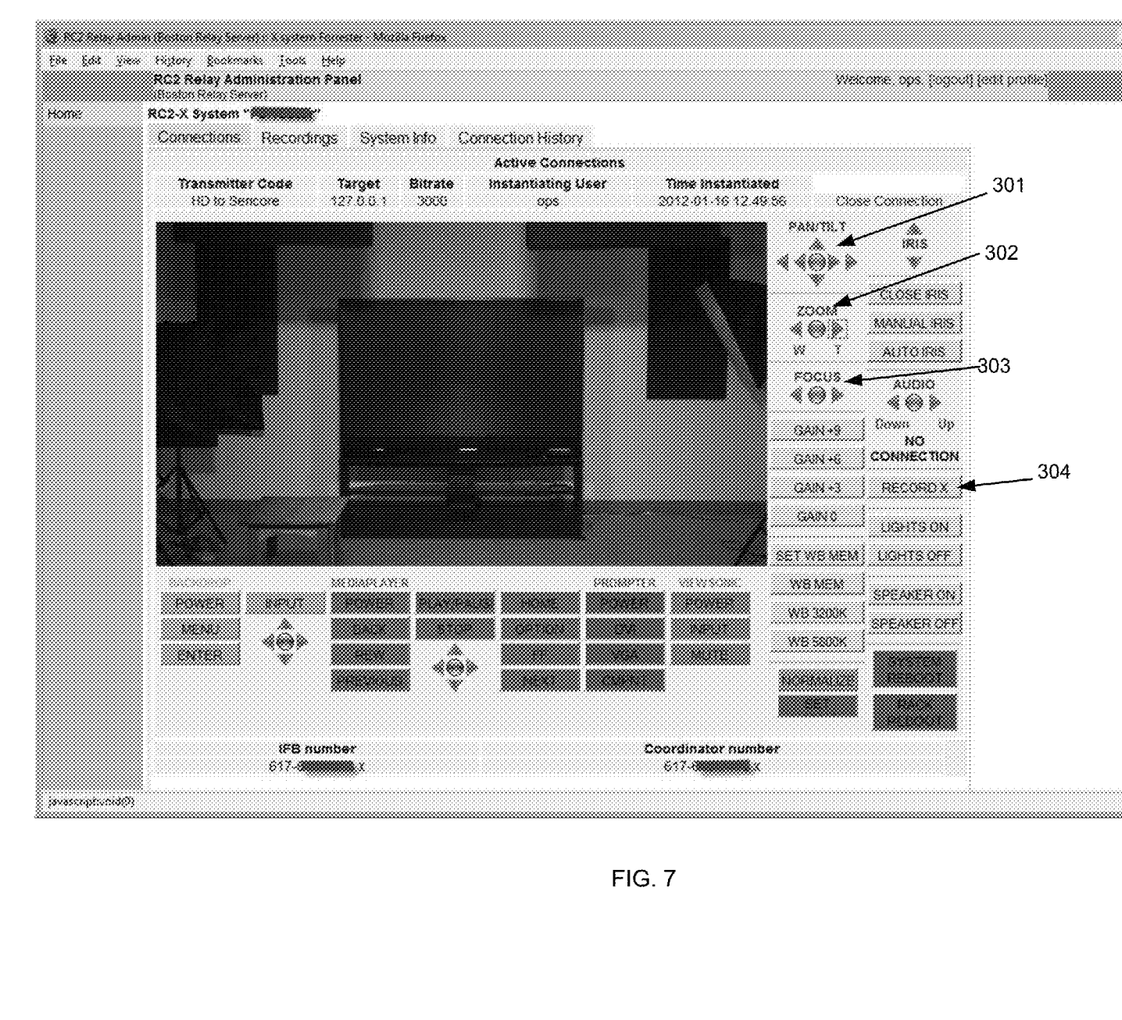
FIG. 7 shows one embodiment of a subsequent webpage served by the relay server to the control computer.

The selected first subsystem 100 also transmits a lower bandwidth video stream to the control stream server 500. Each lower bandwidth video stream is identified by a stream name. The control stream server 500 then serves this lower bandwidth video stream to the control computer 300, such as via a webpage. FIG. 7 shows one such webpage that may be served to the control computer 300 by the relay server 200. This web page contains an embedded control stream served by the control stream server 500. The embedded stream may be identified by its stream name. In this way, the correct control stream video is served from the fifth subsystem 500 to the control computer 300. This page allows for control of the studio, including remote camera 20, lighting 30 and other features. The four arrows 301 allow the remote user to move the camera 20 up, down, left or right. The zoom feature 302 allows the user to zoom the camera 20 in or out as desired. Similarly, the focus feature 303 allows the user to adjust the focus of the camera 20. In addition, other features, such as lights, gain, audio levels and speaker operation, may also be adjusted by the user through this webpage. It should be noted that a camera 20 may have other functions which are not illustrated in FIG. 7. In some embodiments, these functions are controlled without user input. In other embodiments, additional controls may be added to the user interface shown in FIG. 7. In other words, the inclusion of additional functionality in the user interface is within the scope of the invention, and the invention is not limited to the embodiment shown in FIG. 7.

The present system may also allow the output from the camera 20 to be recorded, in addition to being streamed to the video target 400. As described above, first subsystem 100 and fourth subsystem 400 may have high capacity storage devices capable of storing video stream. In some embodiments, the user may wish to store the uncompressed video received from the camera 20 at the first subsystem 100, using device 170. To initiate this feature, the user simply clicks on the "Record X" icon 304.

When the user has completed broadcasting the desired video stream, he may simply disconnect from the video source 100 and video target 400. Alternatively, the relay server 200 may be programmed to allocate a specific amount of time to the user and will automatically terminate the video stream when that duration of time has expired.

In the above example, the lower bandwidth video stream from the video source 100 is transmitted to the control stream server 500, where it is served to the control computer 300. The control information is transmitted from control computer 300 to video source 100 via relay server 200. This allows the relay server 200 to effectively manage all of the resources in the system 10 and to allow the IP addresses of the video sources 100 to remain hidden, if desired. This scheme also allows the network administrator at the video source to know the exact IP address of the relay server 200 which will be communicating with the video source 100.

However, in other embodiments, it may be desirable to allow the control computer 300 to receive the lower bandwidth video stream directly from the video source 100 (as such with a dotted line in FIG. 1). This reduces the bandwidth requirements of the control stream server 500 and also reduces the latency associated with monitoring and controlling the camera 20 from the control computer 300. However, such a scheme may require that a multitude of different IP addresses are able to access the video source 100. In some embodiments, this may be unacceptable to the network administration. In other embodiments, the network administrator may opt to leave the video source 100 outside of the corporate firewall, such that multiple IP addresses do not need to be permitted to pass through the firewall to the video source 100.

Figure 8:
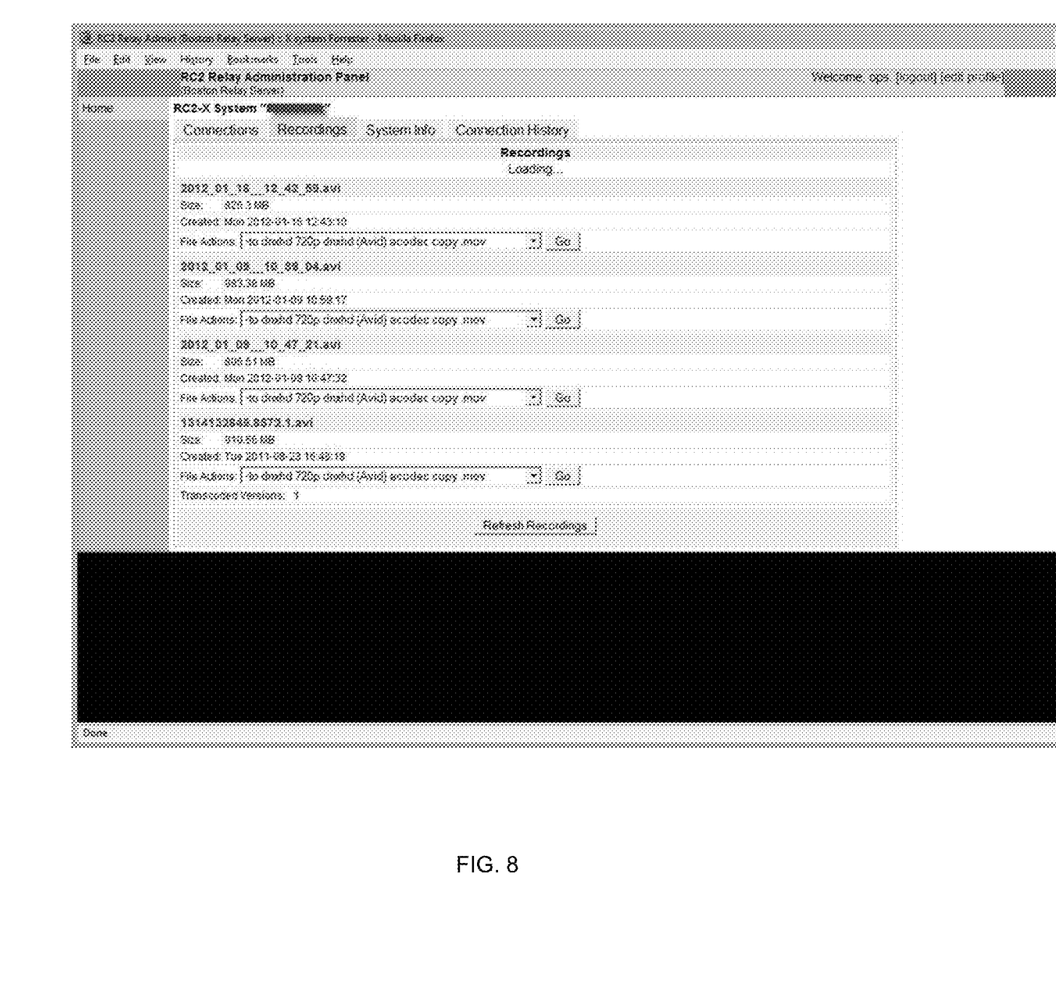
FIG. 8 shows one embodiment of a webpage served by the relay server to the control computer showing previously recorded video streams.

As stated above, the user may have the option of recording the output of the camera 20 in addition to transmitting it. FIG. 8 shows a webpage that may be served to the control computer 300, showing the video recordings that have been made on behalf of this user. As described above, the original recording is preferably performed by the first subsystem 100, where it can be recorded in high definition without regard for realtime bandwidth requirements.

Figure 9:
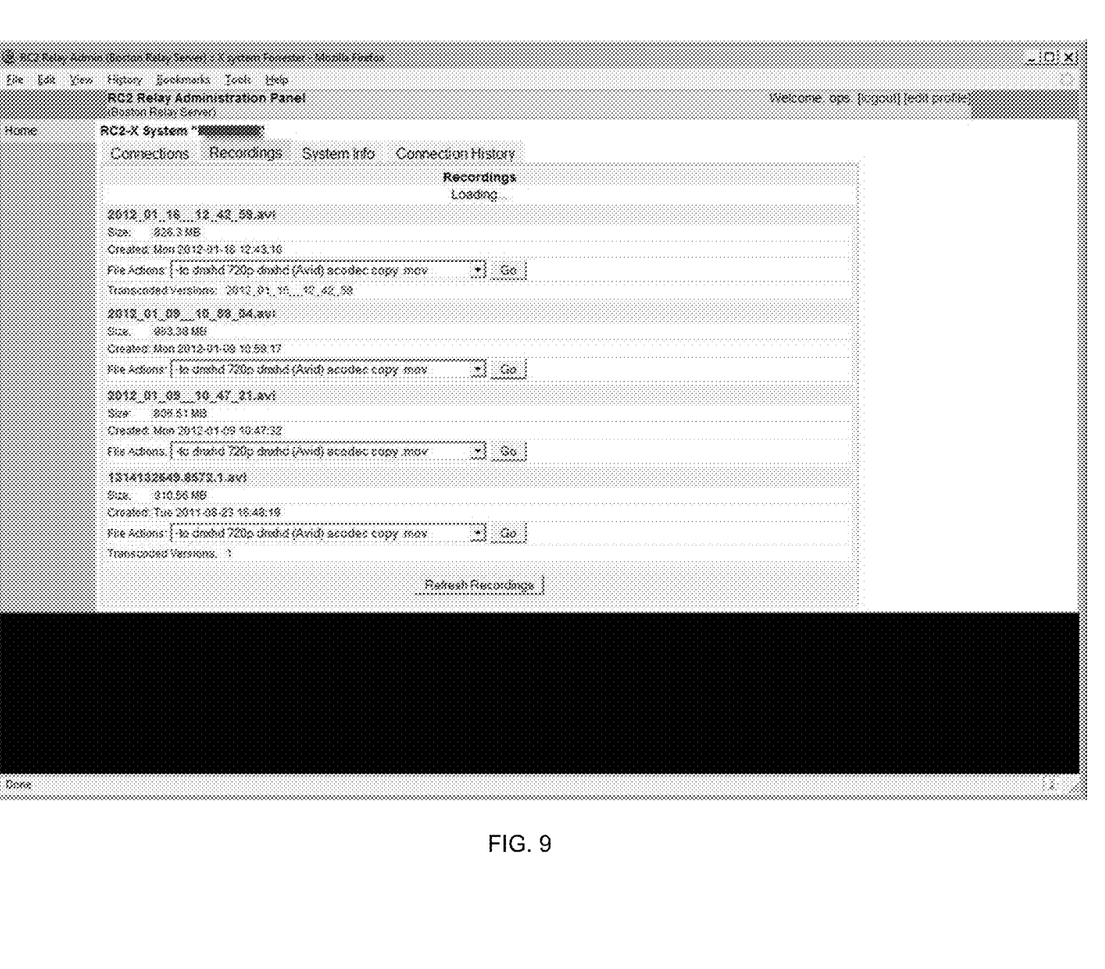
FIG. 9 shows one embodiment of a webpage served by the relay server to the control computer showing previously recorded video streams.

FIG. 8 shows four recordings have been made on behalf of this user, although the number of recordings is not limited by the present invention. In this example, the user would like to convert the first file, named 2012_01_16_12_42_59.avi, to a .mov file, having a resolution of 720p. To do so, the user selects the desired format, such as from a dropdown menu. Having selected the desired format, the user clicks the "Go" icon. After the file has been converted, it is now made available as a transcoded version, as shown in FIG. 9. Because this recorded stream is not necessarily transmitted in real time, it can be transmitted to its destination, which may be the control computer 300, the relay server 200, or any internet connected computer at a lower bandwidth over an extended period of time. For example, it may be prioritized below the other outputs from the first subsystem 100, such that it only consumes network bandwidth when excess bandwidth is available. In this case, it is likely that the recorded video stream will be transmitted during idle times, such as during the night or other periods of inactivity. Once it is transmitted to the destination, it can be postprocessed, or transmitted to a destination of the user's choosing.

The relay server 200 contains the software necessary to implement this system. In some embodiments, it includes a database, such as a SQL database, which may include the names and IP addresses of all video sources and video targets. In addition, the database may have a list of registered users. This database may also have a method of associating the registered users with video sources and video targets which they are allowed to access. Therefore, when a user is authenticated, only the video sources and video targets that are associated with that user are displayed in the webpage shown in FIG. 5. It is noted that a particular video source or video target may be associated with more than one user if desired. The function of the relay server 200 also allows it to monitor the usage of each user, and therefore allows billing and usage data to be collected at this single point. In addition, its central location allows the relay server to know the status of all video sources 100 and video targets 400, as well as any connections therebetween, at all times. As mentioned above, the central location of the relay server 200 also allows it to mask the IP address of all video sources 100 and video targets 400. Finally, the relay server 200 can also serve as the website, serving web pages to remote control computers 300.

The control computers 300 are designed to be remote devices and may be any suitable device, such as a desktop PC, laptop PC, a tablet, an iPad, or a mobile smart phone, which has internet access. As such, a user may access the relay server 200 from any location and control a remote video source 100 as desired. In some embodiments, the control computer 300 may be the same device as the relay server 200, control stream server 500 or video target 400.

In some embodiments, it is expected that the primary and lower bandwidth video streams also contain audio which is synchronized to the video. In many instances, the person in the studio, also referred to as the talent, is responding to questions presented by an interviewer, who is often not collocated with the talent. In other words, the talent is sitting alone in a studio, answering questions into a camera 20.

In the prior art, to feed questions to the talent, it was customary that the interviewer placed a phone call to the control room. The control room then placed a call to the remote studio and a telephone-connected ear piece was placed in the talent's ear. When the interviewer asked a question into the phone line, the question was heard in the talent's ear. Routing the call through the control room also allowed the control room to interrupt or give directions to the talent, as necessary. For example, the control room may provide directions and guidance to the talent before the interview took place. At other times, the control room may interrupt the interviewer, if necessary.

The present invention allows this mechanism for audio transmission to be utilized. In this scenario, it is expected that the phone call would be placed to the user, located at the control computer 300, who would then call the talent at the video source 100. This arrangement allows the user at the control computer 300 to hear the questions and interrupt as was done in the prior art. In this way, the relay server 200 is not involved in the transmission of the audio to the video source; it is only responsible for the audio transmission leaving the video source 100.

In another embodiment, the audio from the interviewer may be transmitted over the internet. In this embodiment, the relay server 200 may be the destination of the interviewer's questions. When initiating the session, in addition to selecting the video source 100 and the video target 400, the user at the control computer 300 may also select the return audio source. This audio source is then routed by the relay server 200 to the selected video source 100 over the internet, in the same fashion as the control information is delivered. The first subsystem 100 decodes the incoming audio signal, and it is then output via an audio jack to the talent. In some embodiments, this audio is also transmitted to the user via the webpage shown in FIG. 7. In some embodiments, the control computer 300 may also have a microphone, allowing the user to speak instructions to the talent as well. In this case, the relay server 200 manages both audio streams (i.e. the interviewer's questions and the user's instructions) to the video source 100 simultaneously. The talent would receive both streams, either through the same earpiece or through two different earpieces. The handling of audio transmissions may be facilitated by the use of a VOIP (Voice Over IP) client operating on subsystem 100, communicating with a VOIP server controlled by subsystem 200. In some embodiments, the return audio routing may be performed by a processing system separate from the second subsystem 200.

The described system includes a plurality of video sources and video targets, which are linked together through the use of a relay server. The relay server is designed to allow remote access by one or more simultaneous users. Each user is allowed to select a video source, a video target and the format and resolution of the stream delivered therebetween. In addition, the remote user, using only the controls available on a keyboard mouse or a pointing device, such as a USB-based joystick or Wacom tablet is able to control the pan/tilt, focus and zoom of the remote camera.

In this way, a distributed system can be created where customers can utilize local studios to allow interviews with experts to occur with limited involvement from the system owner. The customer simply books the studio, and logs into the system to control the stream and select the video target. No additional assistance is required from the system operator. In contrast, the state of the art requires that the system operator be available to remotely control the studio and set up the connections between the studio and the video target.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method of controlling a remote studio camera system, comprising:
    providing a first subsystem configured to receive a video output from a camera and provide control signals to the camera, the first subsystem configured to simultaneously output a first video stream and a second video stream, the first video stream and the second video stream generated from the video output from the camera;
    transmitting the first video stream from the first subsystem to a control computer, wherein the control computer is authorized to view the first video stream;
    providing instructions from the control computer to the first subsystem to control the camera;
    using the control computer to determine a video target and provide an indication of an identity of the video target to the first subsystem, where the video target is different from the first subsystem and the control computer; and
    transmitting the second video stream from the first subsystem to the video target, using the identity provided by the control computer.

2. The method of claim 1, further comprising a relay server, wherein the relay server authenticates the control computer and provides authorization to the control computer.

3. The method of claim 2, wherein the relay server is aware of a plurality of first subsystems, and allows the control computer to select one of the plurality of first subsystems as a video source.

4. The method of claim 3, wherein the relay server serves a web page to the control computer, wherein the web page provides a list of video sources which the control computer is authorized to select from.

5. The method of claim 4, wherein the relay server serves a web page to the control computer providing a list of video targets which the control computer is authorized to select from, and allows the control computer to select one of the plurality of video targets.

6. The method of claim 5, wherein the control computer selects a desired compression method.

7. The method of claim 5, wherein the relay server transmits control information to the first subsystem, the control information selected from the group consisting of the indication of the identity of the video target, a desired resolution and compression method.

8. The method of claim 7, wherein the indication of the identity of the video target comprises an IP address.

9. The method of claim 7, wherein the indication of the identity of the video target comprises a domain name.

10. The method of claim 1, wherein the second video stream is higher bandwidth than the first video stream.

11. The method of claim 1, wherein the transmitting occurs over the internet.

12. The method of claim 1, further comprising a control stream server, wherein the first video stream is transmitted from the first subsystem to the control stream server, and the control stream server transmits the first video stream to the control computer.

13. The method of claim 12, wherein the control stream server is employed to minimize a number of devices that access the first subsystem directly.

14. A method of controlling a remote studio camera system, comprising:
    using a control computer to select a video target, the video target being different from the control computer, wherein a primary video stream will be sent to the video target from the remote studio camera system;
    viewing a low bandwidth control video stream at the control computer, the low bandwidth control video stream originating from the remote studio camera system; and
    using the control computer to control the remote studio camera system based on the low bandwidth control video stream, while the primary video stream is simultaneously delivered directly to the video target.

15. The method of claim 14, wherein the control computer controls the zoom, tilt and pan of the remote studio camera system.

* * * * *